Figure 1:
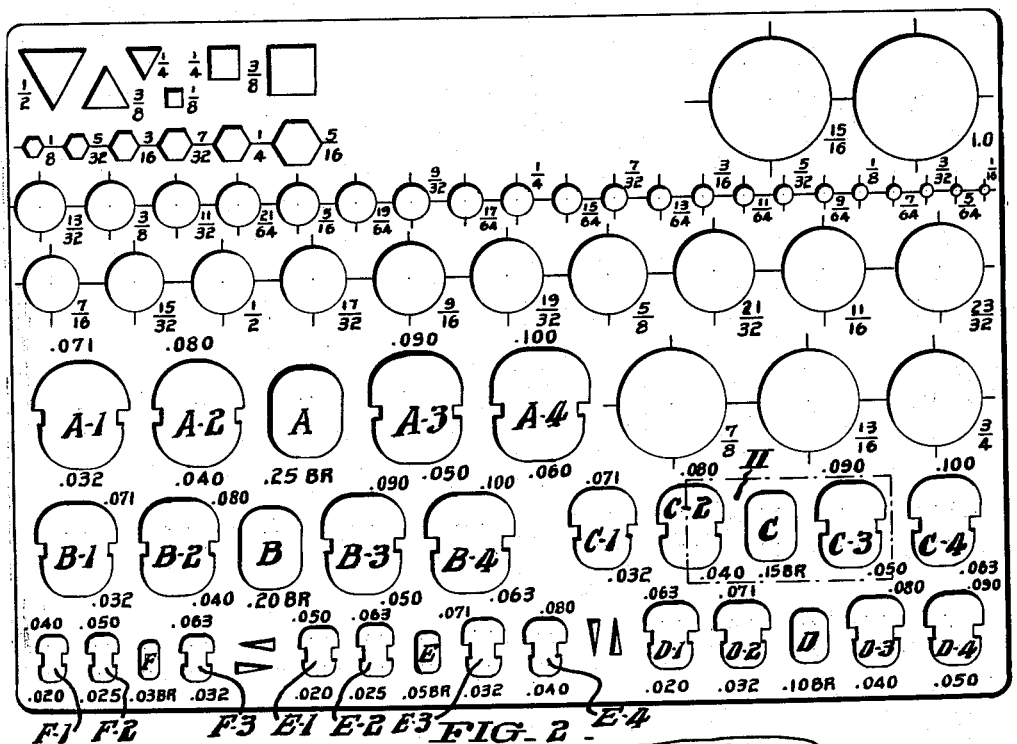

Jan. 28, 1964    A. R. ORNDORFF    3,119,188

DRAFTSMAN'S TEMPLATE

Filed Jan. 31, 1962

INVENTOR.
Arthur R. Orndorff,
BY
Paul & Paul
ATTORNEYS.

United States Patent Office 3,119,188
Patented Jan. 28, 1964

3,119,188
DRAFTSMAN'S TEMPLATE
Arthur R. Orndorff, Holmes, Pa.
(5202 Hayter Ave., Lakewood, Calif.)
Filed Jan. 31, 1962, Ser. No. 170,002
5 Claims. (Cl. 33—174)

This invention relates to a template for an engineering draftsman and particularly to a template which may be used, among other things, to lay out sheet metal structures.

Sheet metal is, of course, used for a wide variety of purposes, such as for parts and components for aircraft, for heating, ventilating and air conditioning systems, and for many others. In laying out a full-scale representation of the part to be fabricated, the engineering draftsman may draw parallel lines spaced apart a distance corresponding to the thickness of the sheet metal to be used which, for example, may be .032 or .040, or .063, or .071, or any one of a number of other standard sheet metal thicknesses. The fabricated part may, and usually does, contain one or more bends. The bends may be 90° bends, or may be bends of a lesser or greater angle than 90°. The optimum radius of a sheet-metal bend varies directly with the thickness and hardness of the particular sheet metal used. That is to say, the thicker and harder the sheet metal, the greater the optimum bend radius. To draw a pair of spaced apart lines around a 90° or other desired bend on the optimum bend radius and keep such lines parallel and equally spaced requires considerable skill on the part of the draftsman. Any variation in the spacing between the lines is quickly picked up by the eye and detracts from the quality of the engineering layout.

It is the object, therefore, of the present invention to provide the engineering draftsman with a template which will enable him to draw accurately and quickly spaced apart lines around a 90° or other bend on a selected bend radius without departing noticeably from the spacing used on the straightline portions of the drawing.

Another object is to provide the engineering draftsman with a universal template which includes, in addition to the usual circular, square, triangular, hexagonal, and other holes ordinarily provided by drafting templates, specially shaped holes designed specifically for drawing, around a 90° or other bend on any one of a number of selected bend radii, parallel lines spaced apart on any one of a number of selected spacings representing any one of a number of standard sheet-metal thicknesses.

Figure 2:
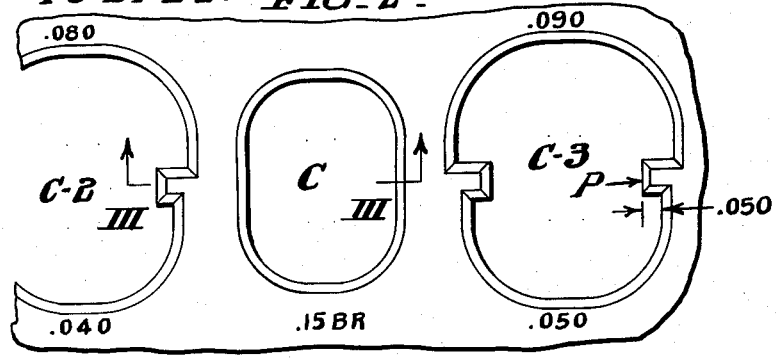

My invention will be best understood from a consideration of the following description of a specific embodiment illustrated in the drawing in which, FIG. 1 is a plan view of my new universal template;
FIG. 2 is an enlarged view of that portion of the template of FIG. 1 shown in dot-and-dash line; and
FIG. 3 is a view in section along the line III—III of FIG. 2.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a manner to accomplish a similar purpose.

The template shown in FIG. 1 shows the usual circular, square, triangular, hexagonal holes and arrows. These are known and conventional shapes in drafting templates. In addition, in accordance with my present invention, the template shown in FIG. 1 includes holes of the shape shown enlarged in FIG. 2. These holes will, for convenience, be referred to herein as bend-radius holes.

Figure 3:
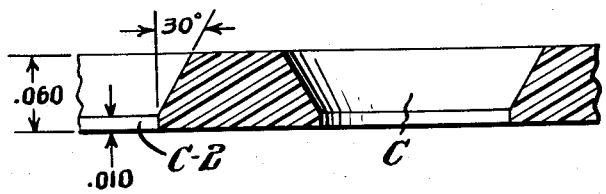

The template of FIG. 1 may preferably be made of transparent plastic material and may have a thickness of the order of .060", as indicated in FIG. 3. As also shown in FIG. 3, the upper portion of the edge or wall of all of the holes of the template may preferably be chamfered or beveled at an inclination of 30°, leaving a vertical edge .010" thick. It is to be understood that these dimensions are illustrative, and not limiting.

In the enlarged view of FIG. 2, the double line which defines each of the bend-radius holes represents the two edges formed by the beveled wall of the hole, as shown in FIG. 3, and just described.

The new template, in the form shown in FIG. 1, contains six groups of bend-radius holes, identified by the letters A to F, inclusive. Each group (except F) contains five holes. The center hole of each of these groups is smaller than the others, the other four being larger. The smaller center hole has four straight sides or flat portions and at each corner a 90° curve corresponding to a particular bend radius. Each of the other larger holes has opposing projections extending laterally into the hole from the mid-point of each of its two vertical sides. The distance between the ends of the opposing projections is preferably equal to the distance between the opposing vertical sides of the smaller center hole. In any event, the projections extend outward from the vertical sides of the hole a distance equal to one of the standard thicknesses of sheet metal, the measurement being accurate to the thousandths part of an inch. The corner curves of the larger holes have a radius equal to the bend radius for that group plus one of the standard thicknesses of sheet metal.

In FIG. 1, the five bend-radius holes identified by the letter A are each associated with a bend radius of 0.25". Hole A is the small center hole. Holes A–1, A–2, A–3, and A–4 are the larger holes of the A group. The template includes a group of five B holes, each associated with a bend radius of 0.20"; a group of five C holes, each associated with a bend radius of 0.15"; a group of five D holes each associated with a bend radius of 0.10"; a group of five E holes, each associated with a bend radius of 0.05"; and a group of four F holes, each associated with a bend radius of 0.03".

It will be seen that in the particular template shown in FIG. 1, in each group the upper half of each of the larger holes is larger than the lower half, and that associated with each half hole is a number such as .071, or .032, or .080. These numbers represent the thickness in inches of the sheet metal for which the half hole provides the outside curve for the bend radius for that particular group. For example, the upper half of the leftmost bend-radius hole of group A, identified as hole A–1, provides the outer curve for .071" sheet metal on a 0.25" bend radius, while the lower half of the A–1 hole provides the outer curve for .032 sheet metal on a 0.25" bend radius. In like manner, the upper half of the rightmost bend-radius hole in group D, identified as hole D-4, provides the outside curve for 0.090" sheet metal on a 0.10" bend radius, while the lower half provides the outside curve for 0.050" sheet metal for the same bend radius of 0.10".

To summarize, the corner curves of the four larger holes of each group have a radius equal to the bend radius for that group plus one of the standard thicknesses of sheet metal. The corner curves of the smaller center hole have a radius equal to the bend radius for the group. The corner curves of the smaller center hole are the guides for the inside curves of the sheet metal bend for a particular bend radius. The four larger holes of the group provide the outside curves.

With reference now to the so-called larger holes, it will be understood that with the template arrangement shown in FIG. 1, half of the bend-radius curves may be drawn with the template in the position shown in FIG. 1, but the other half requires the template to be reversed, i.e., rotated 180°. The need to reverse the template may be avoided by making all the bend-radius holes symmetrical, rather than having the upper and lower halves different. This would, of course, require eight instead of four of the so-called larger holes for each group to cover the same number of sheet metal thicknesses. This may be done by enlarging the template, or by retaining the same size of template but omitting the standard round, square, triangular, and hexagonal holes.

To illustrate how the template of FIG. 1 is used, assume that the draftsman has drawn a pair of straight horizontal lines spaced .050" apart, representing .050" sheet metal, and that he now wants to draw a 90° upward right bend on a radius of 0.15". He positions his straightedge and template such that when his pencil is placed against the lower flat edge portion of the C-3 hole his pencil is in alignment with the lower of his two straight horizontal lines. He moves the template along the straightedge until the C-3 hole is so positioned that when his pencil is placed against the right vertical portion of the hole it is in alignment with the outside or rightmost vertical line to be drawn. The draftsman then draws in the outside curve for the 90° upward right bend using the curve in the lower righthand portion of the C-3 hole. The righthand vertical portion of the C-3 hole permits him to continue to draw his line beyond the quarter turn. This avoids pencil bunching at the end of the quarter turn. He next places his pencil against the edge of the righthand projection P of the C-3 hole and marks a point. This projection extends into the hole .050" beyond the right vertical side of the lower half of the hole. Next he moves his template so that when his pencil is placed against the lower straightaway or flat portion of the C hole (the symmetrical hole in the C group) it is in alignment with the upper of his two horizontal straight lines, and the righthand straightaway portion is in alignment with the pencil point just marked. He then draws in the inside curve using the lower righthand portion of the C hole. Again he continues his line upward along the straightaway portion of the C hole to avoid pencil bunching at the end of the quarter turn.

In the example just described, it was assumed that the draftsman had by some means drawn two horizontal parallel lines spaced apart .050". The template of FIG. 1 may be conveniently used to establish accurately the spacing between the two horizontal lines since the bend-radius holes of each group are accurately located in the template, each of the four non-symmetrical holes of the group being accurately located relative to the center symmetrical hole.

To draw, for example, a pair of horizontal lines spaced .050" apart, the draftsman uses the template as follows: he places the template against his straightedge in such location that the location of the lower of the pair of spaced-apart lines may be marked with a pencil placed against the lower flat portion of the .050" hole in any of the groups. Assume that he uses the A-3 hole. The draftsman then makes a second mark by placing his pencil against the lower flat portion of the symmetrical A hole. The spacing between the two marks so made is .050". It will be seen that no error is introduced by the draftsman's pencil irrespective of the thickness of its lead since any error introduced by the thickness of the pencil or its lead at one mark is cancelled out at the other.

The template may also be used to locate accurately a plurality of parallel spaced-apart lines representing a multi-layer structure since the lower straightaway or flat portion of each of the four non-symmetrical holes of each group (3 holes in the F group) are accurately located in the template relative to the center symmetrical hole and also relative to the lower edge of the template. For example, in the B group, the flat lower edge of the B-1 hole is .032" below the flat lower edge of the B hole, the flat lower edge of the B-2 hole is .040" below the lower edge of the B hole, and so on. Stated another way, and defining the holes relative to the lower edge of the template, the flat lower edge of each of the B-1, B-2, B-3 and B-4 holes is respectively .032", .040", .050", and .063" closer to the lower edge of the template than the flat lower edge of the B hole. The holes are also located accurately relative to the upper edge of the template. For example, in the B group, the flat upper edges of the B-1, B-2, B-3, and B-4 holes are respectively .071", .080", .090", and .100" closer to the upper edge of the template than is the flat upper edge of the B hole. Thus, the template may be used to locate the lines of a multi-ply structure, as for example, a four-ply structure comprised of layers whose thicknesses are .032", .071", .063", and .090".

I have described previously hereinabove the manner in which the template may be used to draw a 90° upward bend. A similar technique may be used to draw a 90° downward bend, except of course that the template is so turned that the curves in the upper part of the radial bend-holes are used.

The template may also be used to draw bends of greater than 90°. In that case, the extending lines meet the bend curves at the points where the extending lines are tangent to the curves.

While the preferred embodiment of this invention has been described in some detail, it will be obvious to one skilled in the art that various modifications may be made without departing from the invention as hereinafter claimed.

Having described my invention, I claim:

1. A template particularly adapted for drawing bends of sheet metal, said template comprising: a flat plate having therethrough a plurality of groups of bend radius guide holes whose adapted edges are adapted for guiding a pencil and the like around corner curves having a selected one of a plurality of different radii, each group being identified with a particular radius, each hole being defined by top, bottom and opposing vertical sides connected by four 90° corner curves, one hole of each group being smaller than the others, its corner curves having the bend radius which identifies that group, the other holes of the group being larger and characterized by opposing projections which project laterally into the hole from the vertical sides of the hole a distance equal to a different selected standard thickness of sheet metal, the corner curves of each of said other holes of the group having a bend-radius dimension equal to the bend radius for that particular group plus one of the standard thicknesses of sheet metal.

2. A template as claimed in claim 1 characterized in that the upper and lower halves of said other holes of a group are of different size and in that the opposing projections project laterally into the hole a different distance from the upper vertical side of the hole than from the lower vertical side of the hole, the distance in each case being equal to a standard thickness of sheet metal.

3. A template as claimed in claim 1 characterized in that the distance between the ends of the opposing lateral projections of said other larger holes is equal to the distance between the opposing vertical sides of said one smaller hole.

4. A template as claimed in claim 2 characterized in that the distance between the ends of the opposing lateral projections of said other larger holes is equal to the distance between the opposing vertical sides of said one smaller hole.

5. A template as claimed in claim 1 characterized in that each hole of a group is so located in the template relative to the other holes of the same group that the bottom of each of the larger holes of the group is located from the bottom edge of the template a distance equal to the distance from the said bottom edge of the template to the bottom of the smaller hole of that group less a distance equal to one of the standard sheet metal thicknesses and in that the top of each of the larger holes of the group is located from the upper edge of the template a distance equal to the distance from the said upper edge to the top of the smaller hole of the group less a distance equal to one of the standard sheet metal thicknesses.

References Cited in the file of this patent

UNITED STATES PATENTS

| | | |
|---|---|---|
| D. 147,026 | Skewis | July 1, 1947 |
| D. 155,687 | Curtis | Oct. 25, 1949 |
| 2,604,702 | Collins | July 29, 1952 |

UNITED STATES PATENT OFFICE
CERTIFICATE OF CORRECTION

Patent No. 3,119,188                                January 28, 1964

Arthur R. Orndorff

It is hereby certified that error appears in the above numbered patent requiring correction and that the said Letters Patent should read as corrected below.

Column 4, line 53, strike out "adapted", first occurrence.

Signed and sealed this 30th day of June 1964.

(SEAL)
Attest:

ERNEST W. SWIDER                                  EDWARD J. BRENNER
Attesting Officer                                     Commissioner of Patents